Patented Oct. 31, 1939

2,177,940

UNITED STATES PATENT OFFICE 2,177,940

ABRASIVE ARTICLE

Samuel S. Kistler, West Boylston, Mass., assignor to Norton Company, Worcester, Mass., a corporation of Massachusetts No Drawing. Application August 1, 1938,
Serial No. 222,533

7 Claims. (Cl. 51—280)

This invention relates to abrasive articles and more particularly to an article made of rubber bonded abrasive grains.

An abrasive article, such as a grinding wheel, may be made by incorporating suitable abrasive grains in a mass of raw rubber compounded with sulfur which is thereafter vulcanized to set the rubber bond as a hard mass adhering firmly to the abrasive grains. In the standard grinding wheel, the vulcanized rubber and sulfur compound substantially fills the spaces between the abrasive grains and the structure and the cutting characteristics of the wheel are determined largely by these two constituents, the abrasive and the bond.

The primary object of this invention is to improve the cutting or grinding characteristics of such a rubber bonded abrasive article and, in particular, to provide a grinding wheel which cuts more freely and efficiently or provides a more satisfactory surface finish than does a wheel made solely of a vulcanized rubber bond. Further objects will be apparent in the following disclosure.

I have discovered that the cutting ability of a rubber bonded abrasive article is materially improved by the incorporation in the rubber bond of a resin formed by the reaction of aniline and formaldehyde and which may be present as a solution therein and/or as discrete particles of resin incorporated within a bonding phase of vulcanized rubber cementing the abrasive grains together.

The aniline and formaldehyde resin may be made in accordance with suitable procedure or as set forth in my copending U. S. patent application Serial No. 212,133 filed June 6, 1938. One satisfactory method of making such a thermoplastic resin comprises mixing from 1.15 to 1.5 mols of formaldehyde with 1 mol of aniline dissolved in an equivalent amount of hydrochloric acid and thereafter neutralizing the acid with sodium hydroxide. For example, 858 cc. of aniline may be dissolved in eight liters of water containing 9.3 mols of hydrochloric acid. To this is added 850 cc. of formaldehyde containing 0.4 gram of formaldehyde per cc. After standing one hour, a quantity of sodium hydroxide is added equivalent to neutralize the hydrochloric acid present. The precipitated resin is then filtered, washed and dried. This material may be then ground to a powder of suitable particle size, and if desired it may be mixed with 0.1 to 1.0 mols of furfural, which is generally found to be advantageous.

The resin as thus or otherwise prepared may be incorporated in a suitably compounded raw rubber and sulfur mixture, abrasive grains in the required proportion are interspersed in this raw bond and the rubber is thereafter set by heat to its vulcanized condition. The abrasive grains may be as desired, such as crystalline alumina, silicon carbide, boron carbide or other suitable abrasive, and the grit size of the grains will be chosen in accordance with the abrading operation to be performed, the grit sizes being ordinarily such as will just pass through screens varying from 8 to 600 meshes per linear inch.

As one example of a grinding wheel made in accordance with this invention, I may utilize crystalline alumina abrasive grains of 100 grit size. The bond may be made of raw rubber compounded with sulfur and an accelerating agent, if desired. An aniline and formaldehyde resin may be made as above described and ground to a particle size of 100 grit size. The abrasive grains, the resin particles and the sulfur together with any other desired material, such as a filler of standard use, may be incorporated in the raw rubber by repeatedly passing the crude raw rubber between mixing rolls and sprinkling small amounts of the sulfur, resin and abrasive grains either together or serially onto the crude rubber and rolling them into the rubber. It is preferred to incorporate the vulcanizing agents in the rubber first, and this may involve utilizing from 1 to 35% by weight of sulfur, based on the weight of the rubber, for producing the desired degree of vulcanization. After the sulfur has been compounded into the rubber, some of the resin particles may then be sprinkled on and folded into the sulfur and rubber mass and passed through the mixing rolls, and this operation is repeated until all of the resin has been added. Thereafter the abrasive grains may be incorporated in the mass in the same manner.

In the final product, as thus produced in the mixing rolls, the abrasive grains and the resin particles, as well as the sulfur, are interspersed as discrete particles throughout the rubber mass. An article of desired shape may then be cut out or molded from the rubber compound and thereafter the mass, while preferably held in a mold, is heated to a required vulcanization temperature, such as 160° C. for the purpose of setting the plastic rubber mass to a hard condition in which it adheres to and units the abrasive grains as an integral structure. Various other methods well known in the industry may be employed for compounding the ingredients and making a vulcanized mass in which the abrasive grains and the resin particles are interspersed throughout the rubber bond. These grains and resin may be so proportioned that either may be in a spaced or a separated condition or the grains may be substantially in contact with one another with the rubber and resin in the spaces therebetween. In the manufacture of standard abrasive wheels, the abrasive grains may constitute from 10 to 70 per cent by volume of the total mass. Numerous other substances may be incorporated in the bond, such as standard fillers heretofore employed with rubber, such as zinc oxide, clay and the like, and suitable accelerators.

The amount of aniline formaldehyde resin employed in the abrasive article may vary from 1 to 60% or more. It is found that the quantity of the resin utilized materially affects the bonding properties of the rubber. While it is not known as to just what happens, it is thought that the resin dissolves in the rubber to some extent and probably as much as 5 parts by weight of resin in 100 parts of rubber. This solution of the resin and the rubber is indicated by the refractive index of the mixture being between the indices of the rubber and the resin. The rubber forms the continuous bonding phase which cements the abrasive grains together, and a portion of the resin remains in the form of discrete particles, if the amount present is greater than that which is capable of dissolving in the rubber. It is believed that the excess of resin which is present as spaced particles serves somewhat the same as would pores within the bond. Hence, the resin appears to affect the bond in two ways, one by intersolution with the rubber and thus changing its physical characteristics, and the other by being present as small particles and forming localized spaced masses within the bond which behave during the grinding operation altogether differently from that of the rubber.

Test strips of hard vulcanized rubber without any abrasive therein but containing various percentages of resin were subjected to tests for determining their tensile strength. The following data was obtained:

| Percent of resin in the rubber | Temperature 20° C. | Temperature 60° C. |
|---|---|---|
| 0 | Lbs/sq. inch | Lbs/sq. inch |
| 5 | 9,620 | 6,680 |
| 10 |  | 6,375 |
| 20 |  | 5,455 |
| 40 | 6,310 | 4,220 |
|  | 2,940 | 2,510 |

The above table giving the strength of the test strips in pounds per square inch shows that an increased resin content produces a decreased strength, and from this we may infer that for a given volume structure of a grinding wheel (i. e. definite volume percentages of abrasive and bond) the wheel will be the softer acting for the higher percentage of resin.

On the other hand, it is found that the resin increases the adhesion of the rubber to the abrasive particles. If test strips are made up of rubber and resin with abrasive incorporated therein, in accordance with the above described procedure, the tensile strength of the abrasive, resin and rubber body containing about 40% of resin in the rubber is found to be at least 50% higher than that of the resin and rubber bond without any abrasive. It is found that pure rubber has a greater tensile strength by itself than has that rubber with abrasive grains incorporated therein. Hence, the presence of the resin appears to have strengthened the abrasive structure materially and presumably by increasing the adhesion of the rubber to the abrasive particles. That is, the bond containing the resin appears to be weaker by itself but to have a greater adhesion to the abrasive grains than has a bond made up of rubber alone. The net result is the provision of an abrasive article which acts altogether differently from that made of abrasive grains bonded solely by standard rubber bonds whether used with or without other types of fillers. It is also thought that the aniline formaldehyde may act somewhat as an accelerator for the vulcanization process and that in some way it thus affects favorably the vulcanization properties of the product. A comparison of these grinding wheels, made as above described, with rubber wheels containing shellac, or natural resins, or phenol-formaldehyde resins, shows that the aniline-formaldehyde resin gives superior cutting properties over all of the others as well as over wheels bonded with rubber alone.

I may also use the synthetic rubbers in combination with the aniline formaldehyde resin, such as neoprene or polybutadiene, known under the trade name of "buna", or polymerized ethylene polysulfide, known to the trade under the name of "thiokol", and the claims are to be interpreted accordingly.

It will now be appreciated that this invention is not to be considered as limited to any particular theory of operation and that the examples above given are illustrative of the invention and are not to be construed as limitations thereon. Various modifications in the process may be employed within the knowledge of one skilled in the art in the light of the above disclosure.

I claim:

1. An abrasive article comprising abrasive grains united by a rubber bond containing aniline-formaldehyde resin.

2. An abrasive article comprising abrasive grains united by a vulcanized rubber bond containing particles of aniline-formaldehyde resin interspersed therein.

3. An abrasive article comprising abrasive grains bonded by a solution of rubber and aniline-formaldehyde.

4. An abrasive article comprising abrasive grains united into an integral structure by a rubber bond which contains from 1 to 60% by weight of aniline formaldehyde resin.

5. An abrasive article comprising abrasive grains united into an integral structure by a hard vulcanized rubber bond containing spaced discrete particles of aniline-formaldehyde resin constituting from 1 to 60% by weight of the bond.

6. Abrasive article according to claim 4 in which the resin contains also the reaction product of furfural.

7. Abrasive article according to claim 4 in which the resin contains also the reaction product of from 0.1 to 1.0 mol of furfural per mol of aniline formaldehyde.

SAMUEL S. KISTLER.